United States Patent [19]
Boring

[11] Patent Number: 5,630,982
[45] Date of Patent: May 20, 1997

[54] METHOD AND APPARATUS FOR EXTRUDING PLASTIC TUBING

[75] Inventor: David E. Boring, East Berlin, Pa.

[73] Assignee: Sonoco Products Company, Hartsville, S.C.

[21] Appl. No.: 571,188

[22] Filed: Dec. 12, 1995

[51] Int. Cl.⁶ .................................................. B29C 47/92
[52] U.S. Cl. .......................... 264/407; 264/412; 264/444; 264/40.1; 264/40.5; 264/562; 264/568; 425/141; 425/174.2; 425/388
[58] Field of Search ........................... 264/407, 412, 264/442, 444, 40.1, 40.5, 562, 568; 425/174.2, 141, 140, 388

[56] References Cited

U.S. PATENT DOCUMENTS

| | | | |
|---|---|---|---|
| 3,914,356 | 10/1975 | Dembiak et al. | 425/140 |
| 3,916,676 | 11/1975 | Boggs et al. | 73/67.8 S |
| 3,923,439 | 12/1975 | Isley et al. | |
| 4,150,929 | 4/1979 | Brandt. | |
| 4,152,380 | 5/1979 | Graves et al. | |
| 4,551,289 | 11/1985 | Schwab et al. | 425/141 |
| 4,605,525 | 8/1986 | Baxter. | |
| 4,663,097 | 5/1987 | Hatfield. | |
| 4,740,146 | 4/1988 | Angelbeck | 264/40.7 |
| 4,768,940 | 9/1988 | Poiesz | 425/141 |
| 4,793,788 | 12/1988 | Borger et al. | 425/141 |
| 4,882,104 | 11/1989 | Dobrowsky | 254/407 |
| 5,094,600 | 3/1992 | Sikora. | |
| 5,120,212 | 6/1992 | Reiber et al. | 425/141 |
| 5,123,823 | 6/1992 | Banjo et al. | |
| 5,286,183 | 2/1994 | Tonsi et al. | |
| 5,303,141 | 4/1994 | Batchelder et al. | |
| 5,346,379 | 9/1994 | Wolfl et al. | 264/407 |

FOREIGN PATENT DOCUMENTS

| | | | |
|---|---|---|---|
| 74639 | 7/1970 | Germany. | |
| 3937273 | 5/1990 | Germany | 264/40.1 |
| 51-59957 | 5/1976 | Japan | 264/407 |
| 55-216 | 1/1980 | Japan | 425/174.2 |
| 58-158233 | 9/1983 | Japan | 425/140 |

*Primary Examiner*—Jeffery R. Thurlow
*Attorney, Agent, or Firm*—Dennison, Meserole, Pollack & Scheiner

[57] ABSTRACT

A method and apparatus for extruding thermoplastic tubing of reduced eccentricity, in which tubing is extruded into a vacuum calibration box containing a cooling fluid and a sizing collar. An ultrasonic device for measuring wall thicknesses around the periphery of the tubing is located downstream of the sizing collar. The wall measurements are used to determine a critical parameter, and if this critical parameter is outside of a predetermined range, the vacuum calibration box is moved in the direction of greater wall thickness. After a delay which allows the product of the correction to reach the ultrasonic device, the box is again moved if necessary, until the critical parameter is within the predetermined range.

12 Claims, 4 Drawing Sheets

METHOD AND APPARATUS FOR EXTRUDING PLASTIC TUBING

BACKGROUND OF THE INVENTION

1. Field of the Invention

The invention relates to a method and apparatus for producing plastic tubing by extrusion, and specifically to a method and apparatus for controlling the eccentricity in the wall of the tubing during the extrusion process.

2. Description of Related Art

Plastic tubes are commonly produced by an extrusion process in which dry polymeric raw materials are passed to an extruder which employs one or more screw type devices which knead and compress the raw material. Heat is applied in the extruder, and the combination of heat and pressure turn the dry raw material into a molten plastic. At the discharge end of the extruder, the molten plastic is forced through a die, more specifically between an outer die portion and a central die insert.

As the hot plastic tubing exits the die it is passed into a vacuum calibration box which is maintained at reduced pressure and filled with a cooling fluid, typically water. Within the vacuum calibration box is a sizing sleeve or collar, possibly in the form of a series of "wafers," which is smaller in diameter than the tubing exiting the die. Because an axial force is applied to the hot tubing as it exits the die, the tubing is reduced in diameter and thickness before it enters the vacuum calibration box.

The center of the extruded tubing is maintained at atmospheric pressure, while the exterior is subjected to a reduced pressure in the vacuum calibration box. The pressure within the tubing thus tends to expand the tubing against the sizing collar and the result is tubing of a fairly uniform outer diameter.

Average wall thickness is controlled by the ratio of extrusion rate to "haul off" rate. Control of extrusion and haul off has been successfully accomplished using ultrasonic thickness measuring systems to control the ratio very precisely. These measuring systems measure and calculate average wall thickness, and through a feedback loop, adjust either extrusion or haul off rate. The result has been excellent control of average wall thickness. However, these systems have no effect on eccentricity or thickness variations from other causes.

Ideally, the calibration sleeve will be precisely aligned with the die. The axial force induces stress in the extruded tubing, but if the die is precisely aligned with the sleeve, the stresses will have no effect on the form of the extruded tubing.

If the sleeve is not precisely aligned with the die, both an axial stress and a lateral stress will be applied. The resultant vector represents the force line along which polymer chains will tend to align. The lateral force vector applies force to the extruded tubing which tends to move the polymer chains peripherally during the drawing, effectively causing a skewed polymer chain alignment.

Skewing is relatively uniform, increasing the density of polymer chains on the side of the extrudate opposite the direction of misalignment. As a result, the extrudate takes an eccentric form, with a slightly thicker wall on the side opposite and a thinner wall on the side toward which the sleeve has been moved.

However, there are other causes for eccentricity in the tube, particularly differences in pressure between the sides of the die. While this variation can have a number of causes, it is usually the result of debris accumulating on the screen at the entrance to the die. If the accumulation is random across the screen, the pressure profile across the die should be uniform.

Frequently, however, debris will accumulate on one side of the die, thus reducing the pressure on that side and causing higher pressure on the unrestricted side. The high pressure behind the unrestricted side causes the mass flow rate of the extrusion to be significantly greater through that side of the die, and will result in a greater quantity of stretched molecular chains. The longitudinal stress in the tube is much higher on that side, with the unbalance causing a notable bow in the tube. A noticeable eccentricity in the tube can also be seen.

In industrial situations, a minimum wall thickness will generally be specified by the end user. In order to achieve this wall thickness, it will be necessary to provide tubing having a higher average wall thickness which will account for deviations and still allow for the minimum specified wall thickness to be met. When eccentricities occur, this greatly increases the deviation in a portion of the tubing, and requires that the average wall thickness be increased in order to insure that the minimum wall thickness is always met. Thus, it would be highly desirable to minimize eccentricities, which will permit reduction in average wall thickness and a great savings in raw material.

The mounting of a typical prior art extrusion die is shown in FIGS. 1 and 1A. The die 10, is formed of a body 11, an outer die ring 12 and a die insert 14; outer die ring 12 is clamped to the body 11 by retaining bolts 13 and is positioned by four positioning screws 16a through 16d.

In order to prevent leakage of the polymer melt, die ring 12 must be held tightly against body 11 of the die. This is accomplished by providing sufficient axial pre-load on the retaining bolts 13 to prevent internal pressure from forcing the die ring to move away from the body. The pre-load must be high enough to resist the maximum internal pressure which will be applied, and consequently is always present to a greater or lesser degree. Internal pressure variations cause corresponding pre-load conditions to exist.

In addition to the steady state conditions described, there is a significant pressure drop related to the end of the extruder screw flight which is transmitted through the plastic melt to the die ring. As the screw rotates, the pressure drop also rotates. Consequently, at any given point in the melt flow, a drop in pressure can be observed with each revolution of the extruder screw, and the resisting force which must be overcome is also a function of the instantaneous screw position.

If an eccentricity in the wall of a tube is noted, one method for its correction is an adjustment in the outer ring end of the die by adjustment of the positioning screws 16a–16d. In order to move the die ring, the movement of the positioning screws must exert sufficient force to overcome the friction between the die ring and the die body. When an adjustment is made, it is made only in the plane normal to the melt flow, and the screws holding the die ring in the complementary plane are normally left tight to prevent unwanted movement. There are therefore two variable frictional forces which must be overcome in order for the adjustment to be made. The necessary force to be applied to cause movement is a function of the pre-load, the complimentary position screw load and the effective static coefficient of friction between the surfaces which must slide.

Typically, force will be applied by adjustment of a positioning screw until it is great enough to overcome the resisting forces. At the instant that movement begins, the resisting force becomes a function of the dynamic coefficient of friction. Since the dynamic coefficient of friction is always much lower than the static resistance to movement, there will be a sudden and dramatic decrease in the resistance to movement. Movement will therefore continue until the dynamic resistance is less than the force applied by the positioning screws.

Since the resisting forces are variable, the actual movement of the die ring will also be variable. Typically, the best precision which can be attained by a careful operator for a single movement is on the order of 0.010". With a typical draw-down at about 50%, this translates into an eccentricity adjustment of approximately 0.005" in the tube wall. Consequently, eccentricity control by adjustment of the positioning screws is coarse as well as tedious.

In industrial practice, it has been discovered that it is possible to correct eccentricities in the tube by movement of the vacuum calibration box, to obtain a misalignment between the sizing sleeve and the die. While this may result in some ovality to the final tube, the wall thickness can be corrected fairly easily and the ovality can be corrected later on. Movement of the vacuum calibration box has been shown to be a fine adjustment, with a fairly large movement of the box resulting in a fairly small correction to wall thickness. While movement of the vacuum calibration box has been shown to be much easier in actual industrial practice, there have been no known attempts to standardize and automate this practice. Indeed, most of the attempts to standardize and automate corrections have been made with regard to the die itself.

SUMMARY OF THE INVENTION

Thus, it is the object of the invention to correct eccentricity in an extruded plastic tube automatically by determining precise wall thicknesses and moving the vacuum calibration box as a result of the measured wall thickness.

To achieve this and other objects, the invention is directed to a process for forming a polymer tube of predetermined wall thickness comprising heating a polymer material to a substantially molten state and extruding the molten polymer through a die having a central insert to produce a hot tube with a hollow central portion. The hot tube is passed into a vacuum calibration box containing a cooling fluid, the hot hollow tube passing through the cooling fluid to cool the polymer with the tube interior being maintained substantially at atmospheric pressure and the exterior of the tube being maintained under reduced pressure. The hot hollow tube is passed within the calibration box through a sizing collar and downstream of the sizing collar, the wall thickness of the tube is measured ultrasonically at a plurality of locations at intervals in a plane perpendicular to the direction of travel of the tube. The measured wall thicknesses are compared to the predetermined wall thickness and to each other, a critical parameter is determined, and when this critical parameter exceeds a predetermined value, the vacuum calibration box is moved in the direction of the greater wall thickness. After a predetermined interval, the measuring, comparing and moving steps are repeated until the critical parameter is smaller than the predetermined amount.

The invention is also directed to an apparatus for extruding plastic tubing comprising an extruder for converting solid plastic to substantially molten form, a die having an insert for extruding the molten polymer therethrough to produce an extruded tube, and a vacuum calibration box maintained internally under reduced pressure containing a cooling fluid and having therein a calibration sleeve of a diameter which is a desired outer diameter of the extruded tubing. The apparatus further includes means for passing extruded tubing through the box, means for horizontal and vertical movement of the box, and means for ultrasonically determining wall thickness comprising means for ultrasonically determining wall thickness at a plurality of points, means for comparing the wall thicknesses and determining a critical parameter, and means for automatically moving the vacuum calibration box in response to this determination in the direction toward the greater wall thickness. Finally, means are provided for repeating the determining, comparing and moving steps after a predetermined interval.

The critical parameter can be an eccentricity factor computed from the measured wall thicknesses, or can be the wall thickness which cannot be permitted to fall below a predetermined value. It is specifically contemplated in connection with this application that a wall thickness less than a minimum necessary value "exceeds" that value.

The method and apparatus of the invention is useful for production of all types of thermoplastic tubes and tubing, including soft tubing often used for medical purposes, and rigid tubes, used for example, as plastic pipe and as packaging for caulk and similar materials.

DESCRIPTION OF THE PREFERRED EMBODIMENTS

Figure 1:
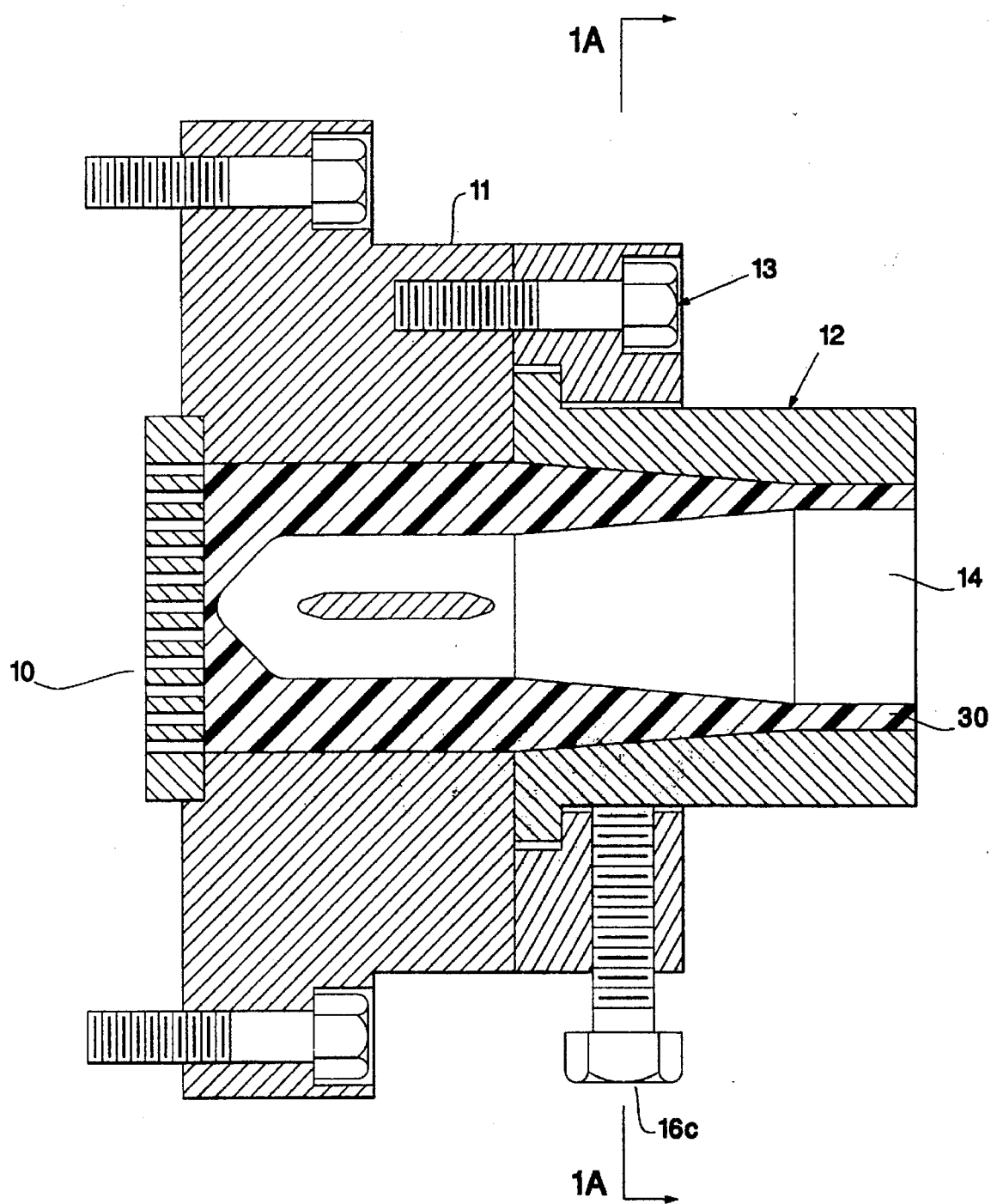
FIG. 1 is an axial cross-sectional view of an extrusion die for plastic tubing as used in the prior art and in the invention.
Figure 1A:
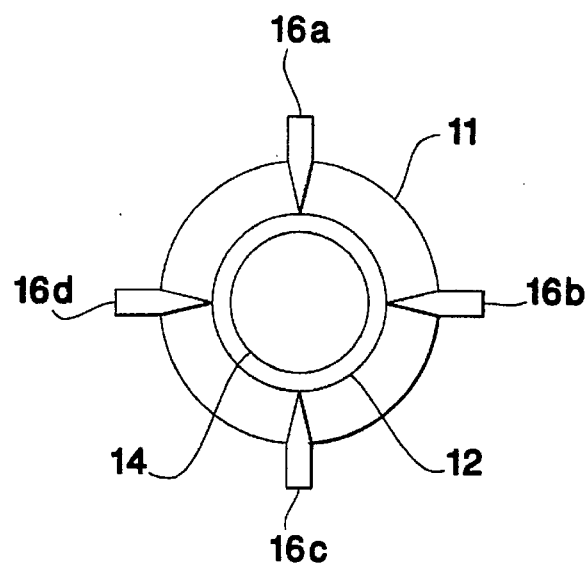
FIG. 1A is a radial cross-sectional view along line 1A—1A of FIG. 1.
Figure 2:
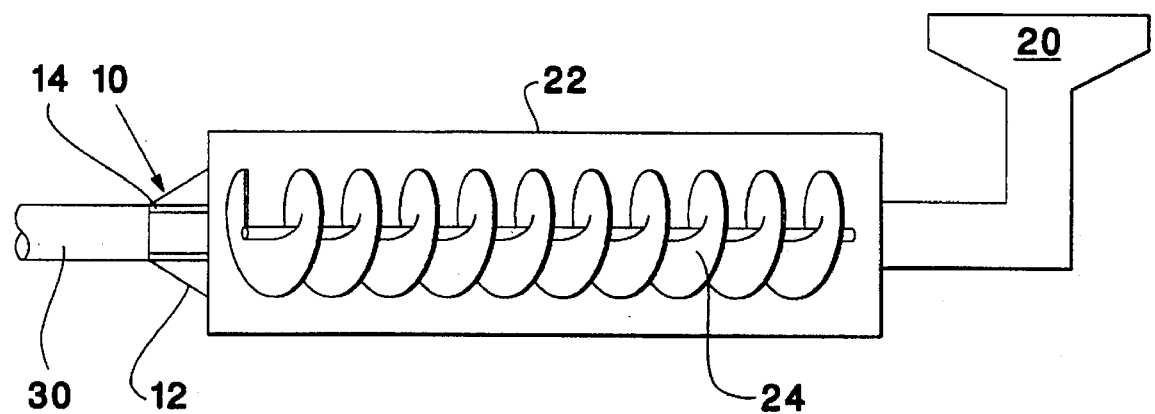
FIG. 2 is a perspective partially cut-away view of an extruder used in the prior art and in the invention.

FIGS. 1 and 2 show a device for extruding plastic tubing as used both in the invention and in the prior art. This extrusion device 18 includes a hopper 20 for feeding thermoplastic pellets, typically polyethylene or high density polyethylene, an extruder 22 including screw threads 24 which transport and knead the thermoplastic pellets under heat and pressure to form a molten plastic and a die 10 including an outer die ring 12 and inner die insert 14. Plastic tubing 30 is continuously extruded from die 10.

Figure 3:
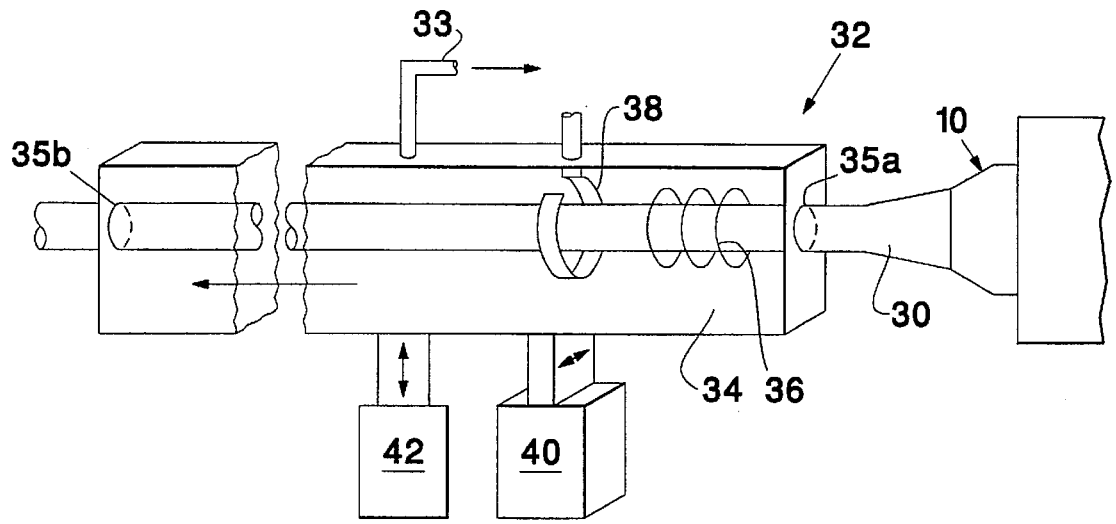
FIG. 3 is a cross-sectional side view of a vacuum calibration box according to the invention.
Figure 5:
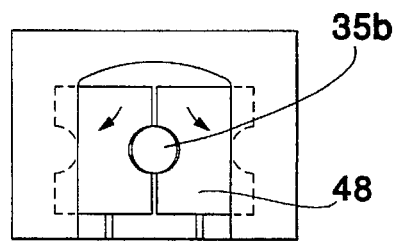
FIG. 5 is an end view of the vacuum calibration box of FIG. 3.

FIGS. 3 and 5 show a vacuum calibration box adapted according to the present invention. The vacuum calibration box 32 includes a port 33 for removing air and is filled with a liquid 34, typically water, for cooling the molten thermoplastic extruded into the box. Tubing enters the box through an entrance gasket 35a, travels in the direction of the arrow and leaves the box through an exit gasket 35b. The gaskets should be substantially water- and air-tight to prevent leakage from the box. A vacuum generator (not shown) connected to port 33 reduces the pressure in the box to the range of 10 to 35 mm Hg.

In the box, the tubing passes through a sizing collar in the form of wafers 36 which provide the final outer diameter of the tubing.

Positioned downstream of the calibration sleeve is an ultrasonic transducer which measures wall thickness at a plurality of points around the periphery of the tubing in a plane perpendicular to the direction of travel of the tube. Such devices are known in the art, particularly devices manufactured by Zumbach Electronics Corp., these devices being known for measuring the eccentricity in the walls of tubes. Measuring device 38 is positioned in the vacuum calibration box in the water, as this configuration is advantageous for taking measurements. The particular device shown is in the form of a split ring containing two ultrasonic transducers, each transducer oscillating over a range of 180° by means of a motor drive(not shown), the wall thickness thus being measured over the entire circumference of the tube.

Transducer 38 emits ultrasonic waves which are reflected at each boundary between two different media. In the case of the tubing, two echos are created which are registered by the transducer. The first echo is created at the transition between the fluid in the box and the tubing. Another echo is created at the transition between the tubing and the air at the inside of the tubing. The time between the two echos is proportional to the wall thickness of the tubing.

Figure 6:
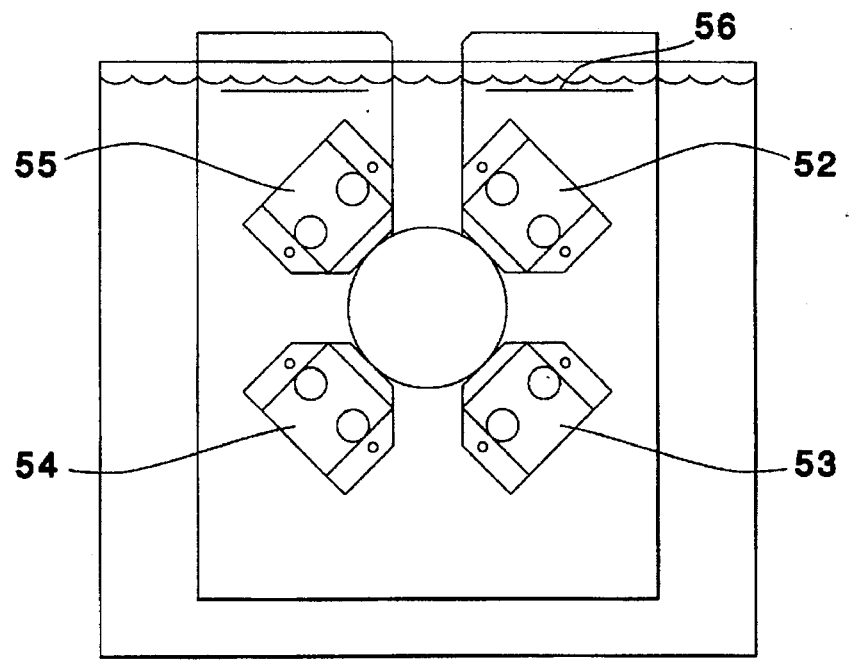
FIG. 6 is a cross-sectional end view of a vacuum calibration box according to an alternate embodiment of the invention.

Alternatively, fixed transducers may be used. FIG. 6 shows four transducers 52, 53, 54 and 55 fixed to a mounting plate 56 within the vacuum calibration box.

Figure 4:
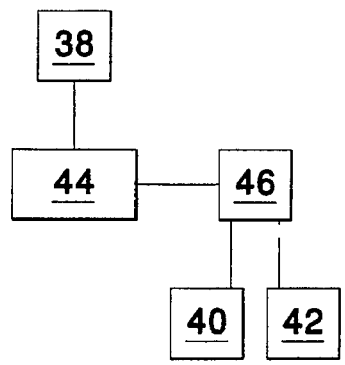
FIG. 4 is a schematic diagram of the interconnection of measurement and control units according to the invention.

FIG. 4 schematically shows the connection of the transducer to the control means. The transducer 38 is connected to a central processing unit 44 the output of which is connected to a control device 46. The central processing unit is capable of calculating wall thickness at intervals around the periphery of the tube, and calculating an eccentricity factor from the intervals. When the eccentricity factor exceeds a predetermined value, a signal is sent to the control unit 46 to adjust the position of the vacuum calibration box. The central processing unit instructs the control device to move the box in the direction of the thickest portion of the wall. Control device 46 generates x(horizontal) and y(vertical) signals.

Two motorized devices are provided for moving the box. Device 40 receives the x-signal, and moves the box in a horizontal direction. Device 42 receives the y-signal and moves the box in a vertical direction.

The precise amount of box movement will be determined by trial and error; typically, however, the amount of movement will be in the vicinity of 100 times the amount of correction necessary in the wall thickness. Thus, if the wall is thinner than desired at a particular point by 0.005 inches, the box will move opposite the direction of the thinness approximately one-half inch.

After an initial box movement is made, no further movements are made until tubing resulting from the correction passes through the transducer. After this delay, if there is still an eccentricity in the tube, another correcting movement of the box is made, and there is another delay until the effects of the correction can be determined.

The movement of the box may impart a slight ovality to the final tube. In order to correct this ovality, where important, a re-rounder 48 as shown in FIG. 5 may be located at the exit to the vacuum calibration box.

Figure 7:
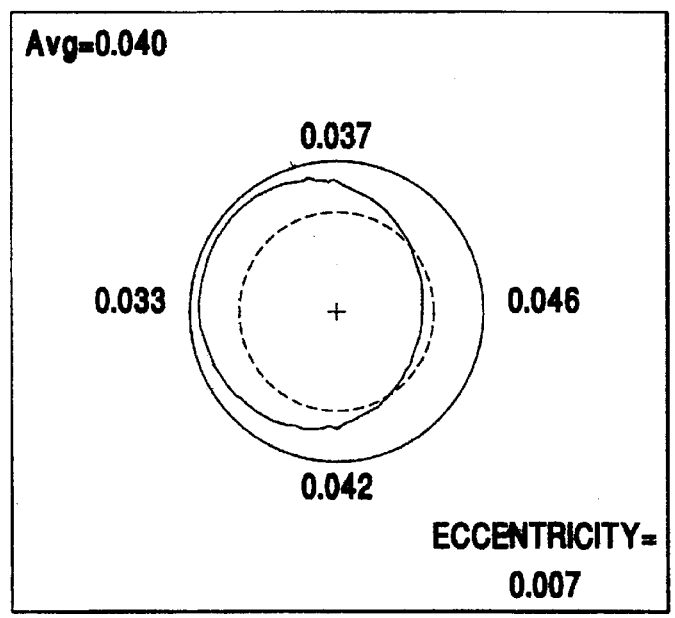
FIG. 7 is an ultrasonically determined image of a tube in cross section with wall thickness measurements.

Optionally, the central processing unit may include a monitor which shows an image of the tube as it passes the transducer. FIG. 7 shows such an image, which includes a display of four wall thicknesses, 0.033, 0.037, 0.042 and 0.046 inches, a display of the calculated average thickness, 0.040 inches. The eccentricity factor, the difference between the average wall thickness and the minimum thickness, is also shown to be 0.007 inches.

EXAMPLE

A tubing specification requires a wall thickness of no less than 0.038 inches. Because the tubing can normally be extruded with a deviation of 0.003 inches, it is necessary to extrude the tubing at an average thickness of 0.041 inches to insure that the specification thickness is met.

Under certain circumstances, an eccentricity occurs in the tube wall resulting in a portion of the tube wall having a thickness of 0.035 inches and another portion of the tube wall having a thickness of 0.044 inches. If no action is taken to correct the eccentricity, it would be necessary to increase the average wall thickness to 0.044 inches in order to insure that the eccentricity does not result in a wall thickness below the specification.

According to the invention, the eccentricity factor is computed as being the difference in wall thicknesses and is computed as being 0.006, beyond the critical value of 0.003. The box is then moved automatically in the direction of the thin wall by 0.3 inches. In this apparatus, the transducer is 2 feet from the extrusion head and the tubing moves at 60 feet per minute. After the initial box movement, no further movements are made for 2 seconds to allow newly extruded tubing to pass by the transducer. If the second measurement shows no eccentricity, no further box movements are necessary.

What is claimed is:

1. A process for forming a polymer tube of predetermined diameter and wall thickness, comprising the steps of:
   a) heating a thermoplastic material to a substantially molten state and extruding said molten thermoplastic through a die having a central insert to produce hot tube with a hollow central portion;
   b) passing the hot tube into a vacuum calibration box containing a cooling fluid, the hot hollow tube passing through the cooling fluid to cool the polymer with the tube being maintained internally substantially at atmospheric pressure and externally under vacuum;
   c) passing the hot hollow tube within the vacuum calibration box through a sizing collar;
   d) downstream of the sizing collar, ultrasonically measuring the wall thickness of the tube simultaneously at a plurality of substantially coplanar points spaced at intervals in a plane at perpendicular to the direction of travel of the tube, and passing the cooled tube out of the box;
   e) calculating a critical parameter which is a function of the measured wall thicknesses;
   f) comparing the calculated critical parameter to a predetermined range, and when the critical parameter is outside of the predetermined range, moving the vacuum calibration box in the direction of greater wall thickness; and
   g) after a predetermined interval, repeating said measuring, comparing and moving steps until the critical parameter is within the predetermined range.

2. In a process for extruding a hollow plastic tube having a predetermined wall thickness and diameter, comprising the steps of providing a polymer in substantially molten form, extruding the molten polymer through a die with a central insert to form a hot, hollow tube, passing the hot, hollow tube through a vacuum calibration box containing a liquid which cools the tube, the tube being maintained internally at atmospheric pressure and externally under vacuum, passing the tube within the vacuum calibration box through a sizing collar, and removing the cooled tube from the box, the improvement comprising:
 a) ultrasonically measuring wall thickness of the tube simultaneously at a plurality of substantially coplanar points in a plane perpendicular to the direction of travel of the tube;
 b) determining a critical parameter which is a function of the measured wall thicknesses;
 c) comparing the calculated critical parameter to a predetermined range, and when the critical parameter is outside of the predetermined range, moving the box in the direction of a greater wall thickness;
 d) after a predetermined interval, repeating said measuring, comparing and moving until the critical parameter is within the predetermined range.

3. Method according to claim 1, additionally comprising re-rounding the tube downstream of the vacuum calibration box.

4. Method according to claim 1, wherein wall thickness is measured at at least four points.

5. Method according to claim 1, wherein the wall thickness is measured continuously around the tube.

6. Method according to claim 1, wherein the critical parameter is eccentricity factor.

7. Method according to claim 1, wherein the critical parameter is minimum wall thickness.

8. A method according to claim 1, wherein the critical parameter is determined by a central processing unit which also compares the critical parameter to the predetermined range.

9. A method according to claim 1, wherein the box is moved by generating signals based on location of lesser wall thickness, and feeding said signals to a device for moving the box horizontally and a device for moving the box vertically.

10. Apparatus for extruding plastic tubing, comprising:
 a) an extruder for converting solid plastic to a substantially molten form;
 b) a die having an insert therein for extruding the molten polymer therethrough to produce an extruded tube;
 c) a vacuum calibration box maintained internally under reduced pressure, containing a cooling fluid and having therein a calibration sleeve of a diameter which is the desired outer diameter of the extruded tubing;
 d) means for passing extruded tubing through the vacuum calibration box;
 e) means for horizontal and vertical movement of the vacuum calibration box;
 f) means for ultrasonically determining wall thickness of the extruded tube as the tube passes through the vacuum calibration box, said means being located downstream of said calibration sleeve and comprising means for simultaneously determining wall thickness at a plurality of points located in a plane perpendicular to the direction of passing of the tube;
 g) means for calculating a critical parameter which is a function of the wall measurements and comparing the critical parameter to a predetermined range;
 h) means for automatically moving said vacuum calibration box in response to determination of a critical parameter which is outside of the predetermined range, in a direction towards a greater wall thickness; and
 i) means for repeating the calculating, comparing and moving after a predetermined interval.

11. Apparatus according to claim 10, wherein said means for determining a critical parameter comprises a central processing unit operationally connected to said means for ultrasonically determining wall thickness.

12. Apparatus according to claim 11, wherein said means for automatically moving comprises a control unit operationally connected to said central processing unit, a motorized horizontal moving device and a motorized vertical moving device, said horizontal and said vertical moving devices being operationally connected to said control unit for receiving signal therefrom.

* * * * *